(12) United States Patent
Rothschild

(10) Patent No.: US 8,884,236 B2
(45) Date of Patent: Nov. 11, 2014

(54) DETECTOR WITH ACTIVE COLLIMATORS

(75) Inventor: Peter J. Rothschild, Newton, MA (US)

(73) Assignee: American Science and Engineering, Inc., Billerica, MA (US)

(*) Notice: Subject to any disclaimer, the term of this patent is extended or adjusted under 35 U.S.C. 154(b) by 638 days.

(21) Appl. No.: 13/163,854

(22) Filed: Jun. 20, 2011

(65) Prior Publication Data
US 2011/0309253 A1    Dec. 22, 2011

Related U.S. Application Data

(60) Provisional application No. 61/356,706, filed on Jun. 21, 2010.

(51) Int. Cl.
*G01T 1/20* (2006.01)
*G01T 1/164* (2006.01)

(52) U.S. Cl.
CPC .................. *G01T 1/1648* (2013.01)
USPC ...................... 250/367; 250/370.11

(58) Field of Classification Search
USPC ............................ 250/367, 370.11
See application file for complete search history.

(56) References Cited

U.S. PATENT DOCUMENTS

| | | | | |
|---|---|---|---|---|
| 4,037,105 A | * | 7/1977 | Laurer | 250/367 |
| 5,317,158 A | * | 5/1994 | McElhaney et al. | 250/367 |
| 5,343,046 A | | 8/1994 | Smith | 250/232 R |
| 5,629,523 A | | 5/1997 | Ngo et al. | 250/370.05 |
| 2006/0145081 A1 | * | 7/2006 | Hawman | 250/363.1 |
| 2010/0006769 A1 | * | 1/2010 | Kraft et al. | 250/370.11 |
| 2013/0208857 A1 | * | 8/2013 | Arodzero et al. | 378/57 |

FOREIGN PATENT DOCUMENTS

| | | |
|---|---|---|
| JP | 58-103678 | 6/1983 |
| WO | WO 2008009528 A1 * | 1/2008 |

OTHER PUBLICATIONS

Korean Intellectual Property Office, Officer Park, PCT/US2011/041033, International Search Report and Written Opinion, date of mailing Feb. 17, 2012, 8 pages.

* cited by examiner

*Primary Examiner* — David Porta
*Assistant Examiner* — Shun Lee
(74) *Attorney, Agent, or Firm* — Sunstein Kann Murphy & Timbers LLP

(57) ABSTRACT

An apparatus and methods for detecting radiation. A plurality of substantially parallel active collimation vanes are sensitive to the incident radiation for generating at least a first detection signal, and a rear detector detects incident radiation that passes between the substantially parallel active collimation vanes and generates a second detection signal. A processor receives and processes both the first and second detection signals. The active collimator vanes may be enclosed within a light-tight enclosure, and a first photodetector may be provided for detecting scintillation arising at the active collimation vanes, while a second photodetector may be provided for detecting scintillation arising at the rear detector.

4 Claims, 4 Drawing Sheets

DETECTOR WITH ACTIVE COLLIMATORS

The present application claims priority from U.S. Provisional Patent Application Ser. No. 61/356,706, filed Jun. 21, 2010, which is incorporated herein by reference.

TECHNICAL FIELD

The present invention relates to an apparatus and methods for detecting x-ray radiation.

BACKGROUND ART

Current methods for restricting the field of view of a detector of penetrating radiation, such as a detector designed to detect scattered x-rays, for example, rely on collimating vanes of radiation-absorbing material placed between the detector and the radiation source in planes generally parallel to the direction of propagation of radiation between the source and the detector. An example of collimated detection is shown in FIG. 1, where an x-ray beam is incident on a block of scattering material, and a detector is being used to detect radiation Compton-scattered out of the incident x-ray beam. In the case of x-rays, materials with a high atomic number Z, such as steel, lead, or tungsten, are typically used as the material of collimating vanes, because, in bulk, they preferentially absorb, rather than scatter, x-rays.

As shown in FIG. 1, a beam 11 of penetrating radiation, such as x-rays, is incident on a body 8. Collimating vanes 10 are used to restrict the field of view of a detector 12 so that the detector detects only radiation 13 that is scattered from points in a region 14 beyond a certain depth in material constituting body 8. Radiation 15 that is scattered from points in a region 16 elsewhere in the material is precluded from reaching detector 12. This configuration allows weak scatter signals from deep objects within body 8 to be detected, while such weak scatter signals would otherwise be lost in strong scatter signals resulting from scatter in nearer regions of the body 8.

A significant problem with the approach depicted in FIG. 1, however, is that any x-rays striking the collimators 10 are absorbed, and, thus, do not contribute to the formation of the image. While this may be less of a problem if the time required to acquire an image (the "scan time") is not important, in many practical applications, however, the scan time is important, and it would be advantageous if more x-ray photons were available to contribute to a detector signal.

SUMMARY OF CERTAIN EMBODIMENTS OF THE INVENTION

In various embodiments of the present invention, an apparatus is provided for detecting incident radiation. The apparatus has a plurality of substantially parallel active collimation vanes sensitive to the radiation for generating at least a first detection signal, and a rear detector for detecting radiation that passes between the substantially parallel active collimation vanes and for generating a second detection signal. A processor is provided for receiving and processing the first and second detection signals.

In other embodiments of the invention, the active collimator vanes may be enclosed within a light-tight enclosure. A first photodetector may be provided for detecting scintillation arising at the active collimation vanes, and a second photodetector may be provided for detecting scintillation arising at the rear detector.

In yet further embodiments of the invention, a method for detecting radiation is provided, having steps of:

a. detecting radiation incident on a plurality of substantially parallel collimating vanes and generating a first detection signal;
b. detecting radiation that passes between the substantially parallel collimating vanes and generating a second detection signal; and
c. processing the first and second detection signal and generating a signal sensitive to a direction of incidence of the radiation.

Additionally, one or more images may be generated that are sensitive to directions of incidence of the radiation.

BRIEF DESCRIPTION OF THE DRAWINGS

The foregoing features of the embodiments will be more readily understood by reference to the following detailed description, taken with reference to the accompanying drawings, in which.

DETAILED DESCRIPTION OF SPECIFIC EMBODIMENTS

Definitions

As used herein and in any appended claims, the term "radiation" shall denote any particles or energy propagating through a medium, typically, but not limited to electromagnetic radiation, such as x-rays, and inclusive of massive particles, such as neutrons or charged particles. The radiation subject to detection may be referred to, for convenience, herein as "x-rays," by way of example, and without limitation.

As used herein and in any appended claims, the term "detector" refers to a material or structure that is sensitive to the radiation being detected, and in response to incidence thereof, emits a signal, typically an electrical signal, that is subject to further processing. In the case of x-ray radiation, the detector may comprise a volume of scintillator material in conjunction with one or more photodetectors, by way of example, and without limitation.

Figure 1:
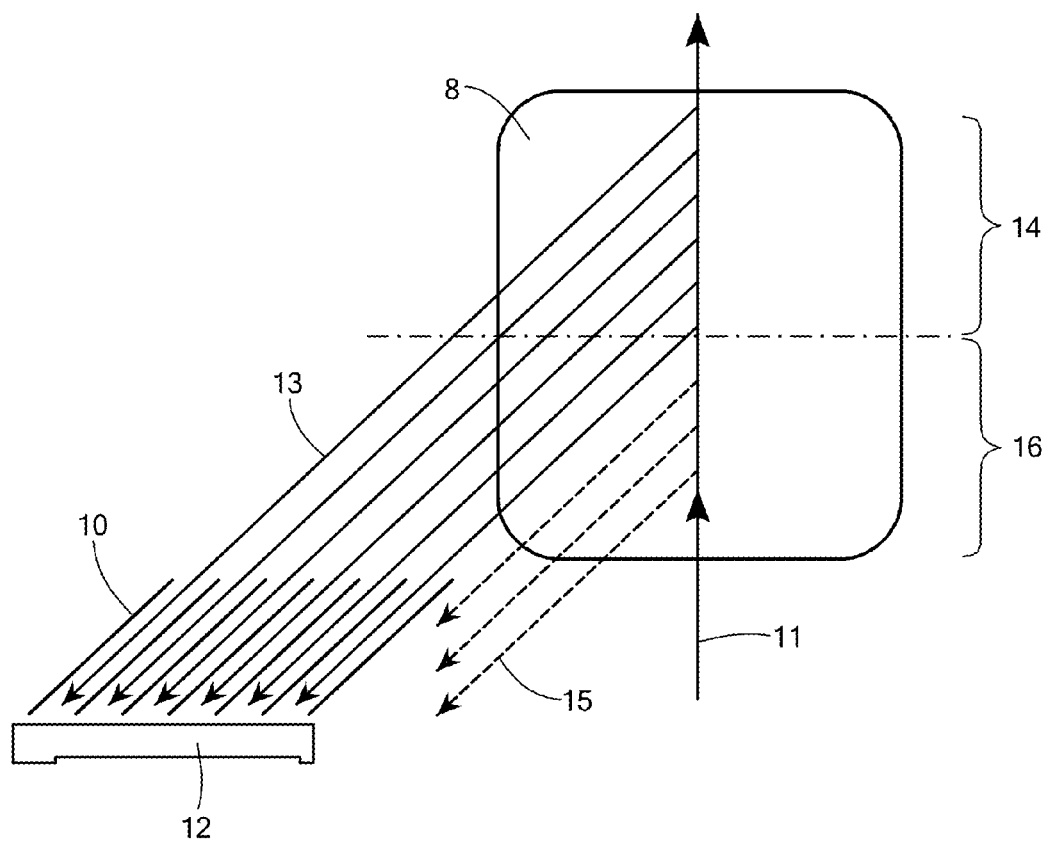
FIG. 1 is a schematic depiction of a detector collimated in accordance with prior art practice for limiting detection to a specified region of scatter.
Figure 2:
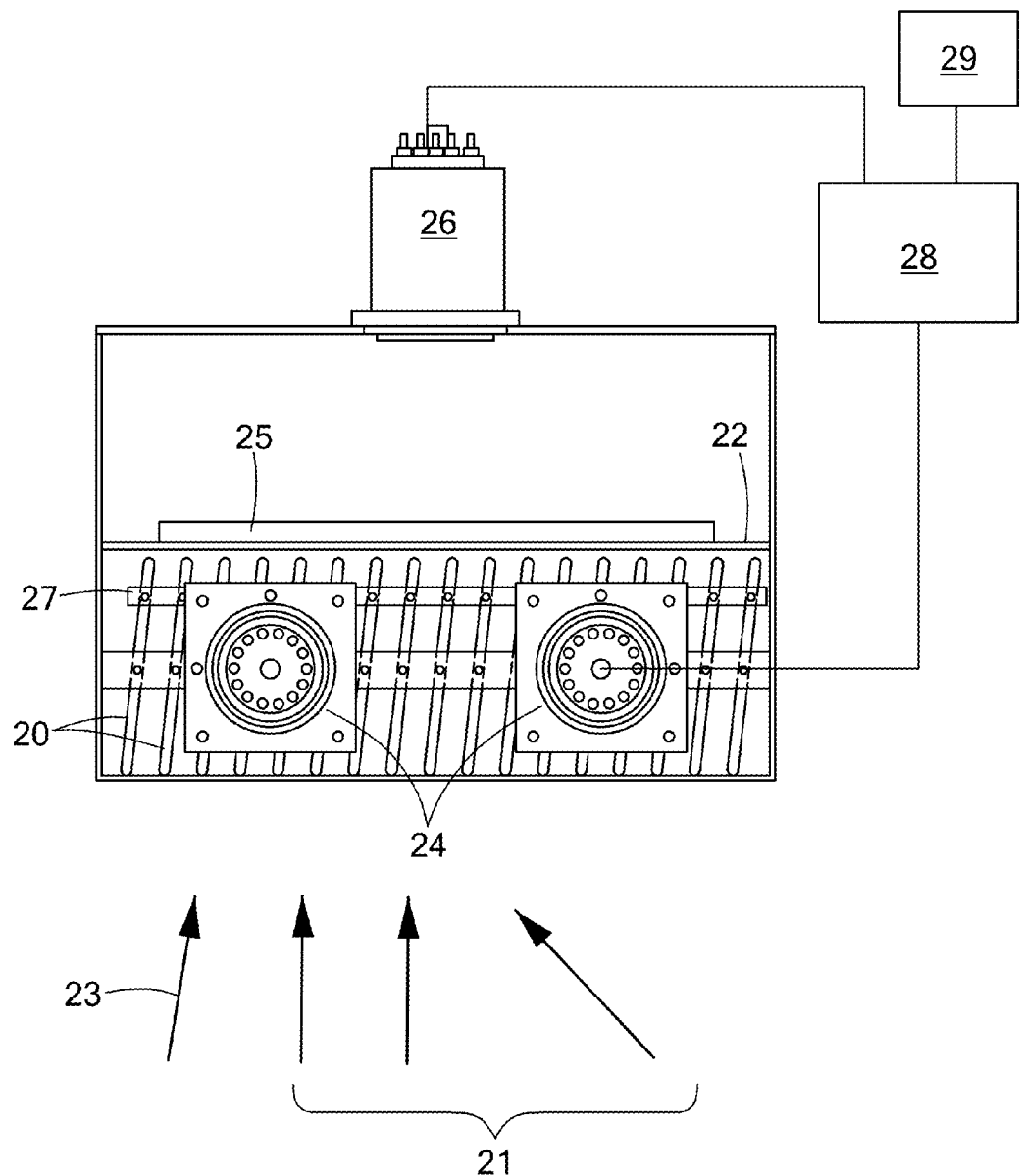
FIG. 2 shows a cross sectional view from the top of a collimated detector in accordance with an embodiment of the present invention.

In accordance with preferred embodiments of the present invention, an apparatus and methods are provided for collimating a detector so as to restrict the field of view of a particular detector (which may be referred to herein as rear detector 25, depicted in FIG. 2) for detecting incoming radiation. The collimators for the rear detector, in addition to restricting the field of view of the rear detector, are also designed to be sensitive to the radiation being detected, so that the total detection efficiency of the detector is maintained or enhanced.

Embodiments of the invention referred to herein as "active" collimators are now described with reference to FIG. 2. Active collimating vanes 20 (also referred to, herein, as "collimation vanes") consist of x-ray sensitive material, such as a thin scintillating phosphor screen. Collimation vanes 20 are placed inside a light-tight enclosure 22 and the scintillation light from the active vanes is collected by one or more photodetectors 24. At least a subset of collimation vanes 20 are substantially parallel. X-ray photons 23 oriented to pass through the gaps in the collimation vanes 20 are incident on a detector 25, placed in close proximity behind the vanes. This rear detector 25 can consist of a hollow light guide, read out by photomultiplier tubes (PMTs) 26 (or other photodetector or photodetectors) and lined with phosphor screen, as is known by those skilled in the art, or can consist, for example, of plastic or liquid scintillator viewed by PMTs or other photodetectors. Radiation 21 that has a direction of origin such that it is not oriented to pass through the gaps in the collimation vanes 20 to rear detector 25 may be detected, instead, by virtue of scintillation of the active collimation vanes 20 themselves. Adjustor 27 is provided to govern the angle of a partial, or complete, set of vanes 20, where the angle is determined with respect to a normal direction to the rear detector 25. Photodetectors 24 generate at least one detector signal based on penetrating radiation detected by virtue of active vanes 20, while photodetectors 26 generate at least a second detector signal by virtue of penetrating radiation that reaches rear detector 25. (Photodetector 26 may be a photomultiplier tube, for example.) Processor 28 receives the detector signals from the respective photodetectors and analyzes them. Processor 28 may, additionally, generate a tangible image (or multiple images) displayed on monitor 29, employing image generation techniques known or subsequently developed.

The invention may advantageously be used for creating high quality uncollimated backscatter images, while simultaneously creating collimated images that reveal items concealed deeper inside the object being inspected. The scintillation light collected from the collimation vanes can be used to create an uncollimated backscatter image with high-statistics (i.e., a high signal-to-noise ratio due to a large number of detected photons), while the light collected from the scintillator in the rear compartment is due to the detection of collimated x-rays that pass through the vanes, and have, therefore, originated from scatter that occurred in a particular direction, and, more particularly, in a direction indicating a deeper origin inside the inspected object.

Figure 3:
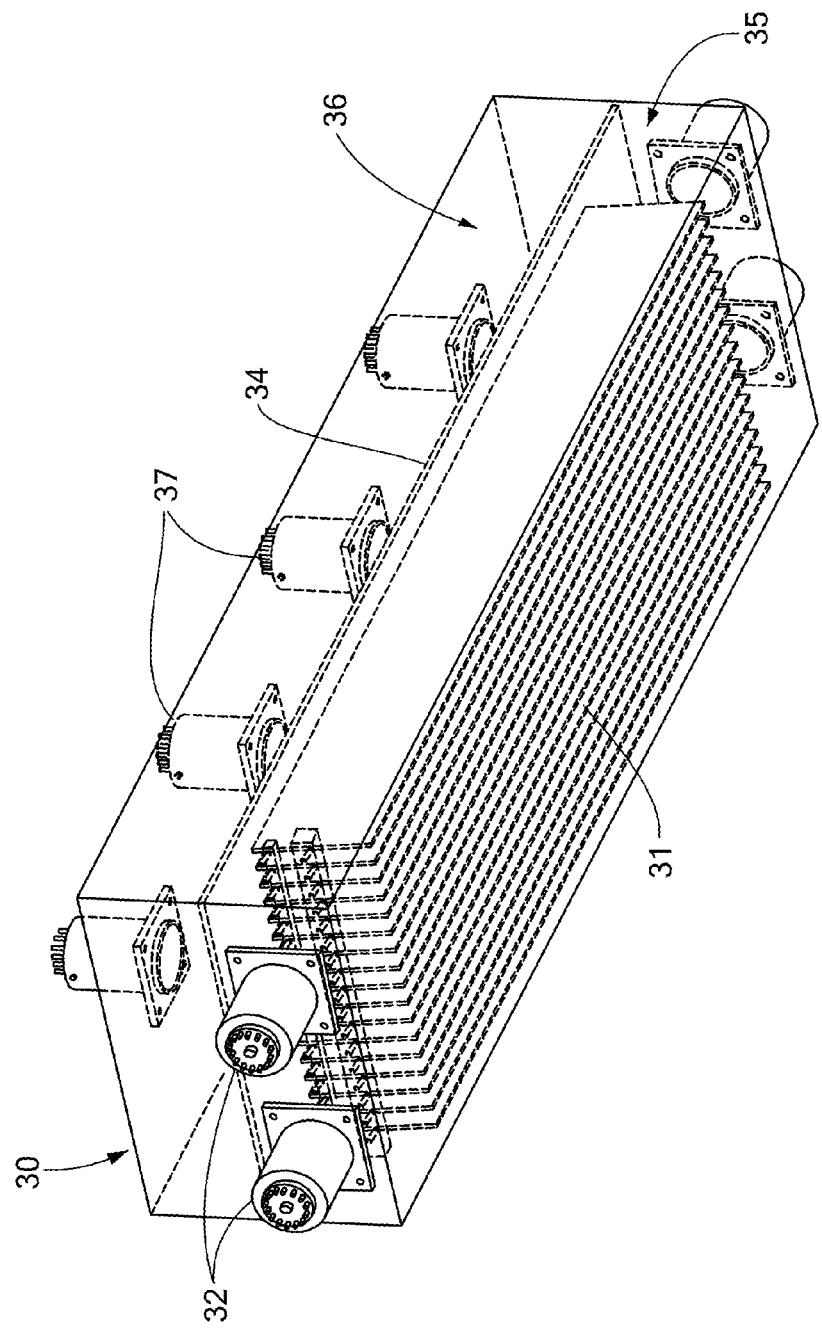
FIG. 3 shows a perspective view of a detection apparatus in accordance with an embodiment of the present invention.

FIG. 3 shows an embodiment of a detector 30 for a backscatter imaging system. The angle of a set of active collimating vanes 31 may either be adjusted once at the factory, or may be attached to any kind of electro-mechanical device provided to dynamically adjust them, depending on the type and/or distance of the object being scanned. The scintillation light from the collimating vanes is detected by one or more photodetectors (for example, by PMTs 32 located at the top and bottom of the front compartment of the detector). A rear compartment 36 of the detector is optically isolated from a front compartment 35 by a light baffle 34, and scintillation light from x-rays detected in rear compartment 36 are collected by a second set of one or more photodetectors (for example, PMTs 37 mounted on the rear face of the detector. The rear compartment may be lined with scintillating phosphor screen, for example, or, in other embodiments of the invention, may contain plastic or liquid scintillator.

Figure 4:
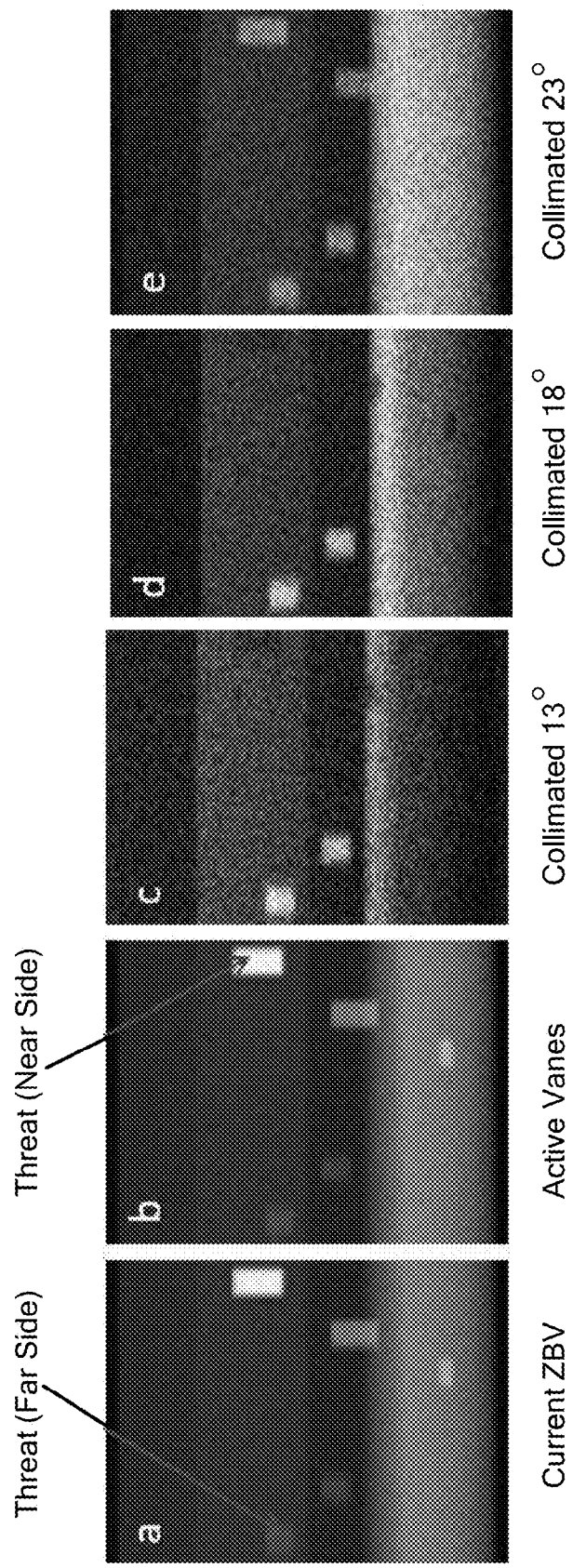
FIGS. 4a-4e show computer-simulated images of organic threats that have been concealed inside a vehicle and imaged using prior art methods (in FIG. 4a), and in accordance with embodiments of the present invention (in FIGS. 4b-4e).

FIGS. 4a-4e show computer-simulated images of organic threats that have been concealed inside a vehicle. FIG. 4a shows the vehicle as it would be imaged by a standard AS&E Z-Backscatter Van (ZBV). A threat concealed on the nearside of the vehicle shows up very clearly as a bright white rectangle in the upper right. A threat on the far side is much more difficult to see in the image, and appears as a dim square in the middle left. Despite this shortcoming, however, many x-rays are being detected with this detector configuration, and the smoothness, or signal-to-noise ratio of the image is high.

The image shown in FIG. 4b was created using the signal from the front compartment of detectors similar to that shown in FIG. 3, and with a total effective area equal to that of a detector typically used in an x-ray backscatter inspection van. The signal from the front compartments is due to the detection of all the x-rays striking the active collimators, and it can be seen by comparing FIGS. 4a and 4b that the images are almost identical in quality. In addition to this image, signals from the rear compartments of the detectors can be summed together to create a collimated backscatter image, which preferentially shows scatter from objects concealed deeper inside the target object. FIGS. 4c, 4d, and 4e show images created from the detection of the collimated x-rays (i.e. x-rays detected in the rear compartment of the detector) for collimation vanes at 13, 18, and 23 degrees from the normal, respectively. It can be seen that the far threats can be seen very clearly in FIGS. 4c and 4d, compared with the un-collimated image in FIG. 4b, in which scatter from the near regions of the target object overwhelm the weak scatter signal from the further objects. In FIG. 4e, it can be seen that due to the larger angle of the collimating vanes, some of the scatter from the far objects is no longer being detected in the collimated image and some of the scatter from the nearer objects is now being included. It appears from this example that collimation vanes at about 18 degrees to the normal to the rear detector are preferred for detection of the far objects (FIG. 4d).

All of the heretofore described embodiments of the invention are intended to be merely exemplary and numerous variations and modifications will be apparent to those skilled in the art. All such variations and modifications are intended to be within the scope of the present invention as described by the appended claims.

I claim:

1. An apparatus for detecting radiation incident upon the apparatus, the apparatus comprising:
   a. a plurality of substantially parallel active collimation vanes sensitive to the radiation, the substantially parallel active collimation vanes enclosed within a light-tight front compartment, for generating an uncollimated detection signal;
   b. a rear detector, optically isolated from the front compartment, for detecting radiation that passes between the substantially parallel active collimation vanes of the plurality of active collimator vanes and generating a detection signal sensitive to a direction of the radiation incident upon the apparatus; and
   c. a processor adapted for receiving and processing the uncollimated detection signal into an uncollimated backscatter image and for receiving and processing the detection signal sensitive to a direction of the radiation incident upon the apparatus into a collimated image.

2. An apparatus in accordance with claim 1, further comprising a first photodetector for detecting scintillation arising at the rear detector and generating a detection signal sensitive to a direction of the radiation incident upon the apparatus.

3. An apparatus in accordance with claim 2, further comprising a second photodetector for detecting scintillation arising at the active collimation vanes and for generating said uncollimated detection signal.

4. An apparatus in accordance with claim 1, further comprising an adjustor for governing an angle of at least a partial set of said collimation vanes with respect to a normal to the rear detector.

* * * * *